United States Patent
Lewey et al.

(10) Patent No.: US 7,568,793 B2
(45) Date of Patent: Aug. 4, 2009

(54) PRINTING FLUID CONTROL IN PRINTING DEVICE

(75) Inventors: William E Lewey, Corvallis, OR (US); David N. Olsen, Corvallis, OR (US); Steven N Miller, SW Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 11/262,196

(22) Filed: Oct. 28, 2005

(65) Prior Publication Data

US 2007/0097188 A1 May 3, 2007

(51) Int. Cl.
    *B41J 2/175* (2006.01)
(52) U.S. Cl. ........................................... 347/85
(58) Field of Classification Search ............... 347/84, 347/85, 86, 87; 137/383, 384.2, 384.6
    See application file for complete search history.

(56) References Cited

U.S. PATENT DOCUMENTS

| | | | | |
|---|---|---|---|---|
| 4,914,453 A | * | 4/1990 | Kanayama et al. ............. | 347/86 |
| 5,126,755 A | * | 6/1992 | Sharpe et al. ................. | 347/54 |
| 5,929,883 A | * | 7/1999 | Gunther et al. ............... | 347/85 |
| 6,084,617 A | * | 7/2000 | Balazer ....................... | 347/86 |
| 6,179,406 B1 | * | 1/2001 | Ito et al. ....................... | 347/35 |
| 6,257,714 B1 | * | 7/2001 | Seccombe ..................... | 347/92 |
| 6,325,354 B1 | * | 12/2001 | Hoen et al. .................... | 251/65 |
| 6,431,693 B2 | * | 8/2002 | Eida ............................ | 347/85 |
| 6,478,417 B2 | * | 11/2002 | Hoen et al. .................... | 347/92 |
| 6,824,256 B2 | * | 11/2004 | Thielman et al. .............. | 347/85 |
| 6,908,180 B2 | * | 6/2005 | Dietl ........................... | 347/85 |
| 2001/0022603 A1 | | 9/2001 | Eida | |

FOREIGN PATENT DOCUMENTS

| | | |
|---|---|---|
| EP | 1452320 | 9/2004 |
| JP | 58108157 | 6/1983 |

OTHER PUBLICATIONS

International Search Report for Application No. PCT/US2006/029499. Report Issued Dec. 28, 2006.

* cited by examiner

*Primary Examiner*—Anh T. N. Vo

(57) ABSTRACT

A fluid pathway is configured to selectively fluidically couple a printing fluid supply container to a printhead. The pathway includes a fail safe valve that that is configured to open as a result of movement of a moveable carriage and to thereafter remain open based on the availability of an electrical power signal.

14 Claims, 4 Drawing Sheets

PRINTING FLUID CONTROL IN PRINTING DEVICE

RELATED PATENT APPLICATIONS

This patent application is related to U.S. patent application Ser. No. 11/261,681 titled "Fluid Delivery System For Printing Device", filed Oct. 28, 2005.

This patent application is related to U.S. patent application Ser. No. 11/261,680 titled "Free Flow Fluid Delivery System For Printing Device", filed Oct. 28, 2005.

This patent application is related to U.S. patent application Ser. No. 11/261,679, titled "Free Flow Fluid Delivery System For Printing Device", filed Oct. 28, 2005.

BACKGROUND

Some printing devices include a printhead or pen that is configured to controllably direct drops of ink(s) or other like printing fluid(s) towards a sheet of paper or other like print medium. The inks or printing fluids are typically supplied by to the printhead by a fluid delivery system. Some fluid delivery systems are located "on-axis" with the printhead while others also include "off-axis" components. The fluid delivery system may include, for example, one or more containers that act as reservoirs to supply the fluids to the printhead through one or more fluidic channels.

In certain printing devices, the fluid delivery system is configured to maintain a backpressure force on the printing fluid so as to prevent the printing fluid from simply draining out through the ejection nozzles of the printhead. Accordingly, as the printing fluid is ejected during printing the fluid delivery system is usually configured to adapt to the reduced volume of printing fluid in some manner so as to maintain the backpressure force within applicable limits. For example, some fluid delivery systems include foam or other like capillary members within an on-axis container. The foam acts like a sponge in holding the printing fluid while also allowing the fluid to be used for printing. The capillary action of the foam provides the backpressure force. As the printing fluid is consumed air is allowed to enter into the container and into the foam.

In other exemplary printing devices, the printing fluid is delivered from on-axis and/or off-axis containers that do not include foam. Some of these containers include a bag-accumulator arrangement or the like that provides the desired backpressure force. Some of these containers include a bubbler feature that is configured to allow air to bubble into the container through the printing fluid to maintain the desired backpressure force. Some off-axis implementations also include additional containers adjacent the printhead.

In some implementations, a pump may also be provided to move the printing fluid in one or both directions between the container and the printhead.

There is a need for methods and apparatuses that can control the flow of printing fluid between the container and the printhead during certain instances.

BRIEF DESCRIPTION OF THE DRAWINGS

The following detailed description refers to the accompanying figures.

DETAILED DESCRIPTION

Figure 1:
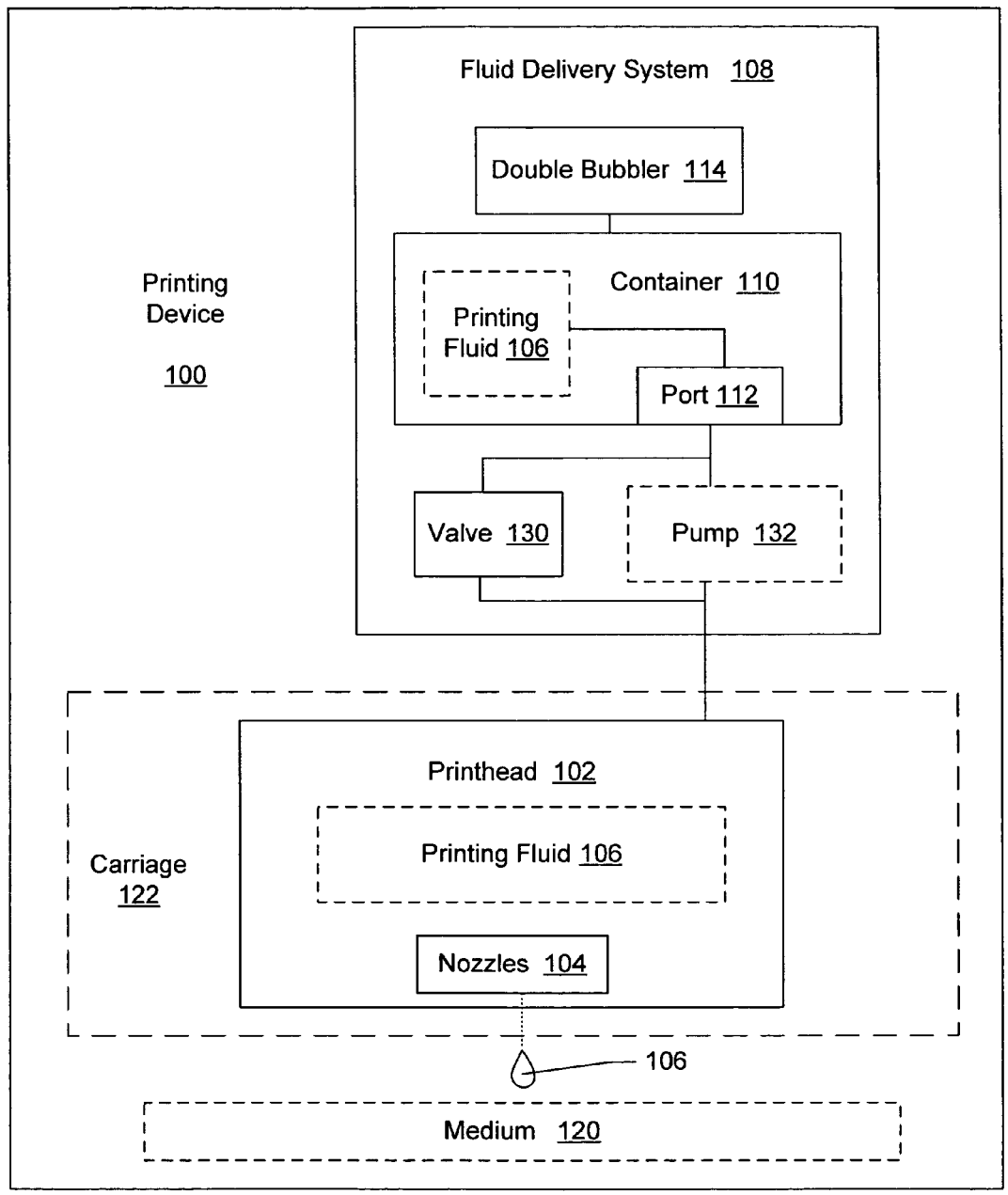
FIG. 1 is a block diagram illustrating certain features of a printing device including a fluid delivery system having a container and a fail safe valve, in accordance with certain exemplary implementations.

FIG. 1 is a block diagram of an exemplary printing device 100 having a printhead 102 with a plurality of nozzles 104 for forming an image on a print medium 120 using selectively ejected droplets of at least one printing fluid 106. Printing fluid 106 is supplied to printhead 102 by a printing fluid delivery system 108 that includes a supply of printing fluid 106 in a container 110. Printhead 102 may be arranged "on-axis" with regard to the printing process by way of a moving carriage 122 or the like. Container 110 may be arranged "off-axis" and operatively coupled to printhead 102 through a pathway of one or more fluidic couplings (not shown) such as, for example, channels, tubes, pipes, fittings, etc. Container 110 includes a printing fluid port 112 through which printing fluid 106 exits container 110. In certain implementations, printing fluid 106 and/or gas may also enter into container 110 through printing fluid port 112.

A double bubbler 114 may be included in printing fluid delivery system 108 to regulate gas pressure within container 110, for example, based on the gas pressure of the atmosphere outside of container 110. In this example, double bubbler 114 is bi-directional in that it is configured to allow gas within container 110 to escape into the atmosphere and to allow gas from the atmosphere to enter into container 110 based on a pressure difference between the gas in the container and gas in the atmosphere. Thus, for example, when the absolute value or magnitude of the pressure difference reaches a threshold level then double bubbler 114 will permit gas to enter or exit container 110, flowing or bubbling from the higher pressure side to the lower pressure side. Exemplary double bubbler methods and apparatuses are presented in more detail in the related patent application titled "Fluid Delivery System For Printing Device", which is incorporated, in its entirely, by reference herein.

Printing fluid delivery system 108 may supply printing fluid 106 to printhead 102 through a pathway that uses the ejecting action of nozzles 104 to urge printing fluid 106 from container 110 through printing fluid port 112. Printing fluid delivery system 108 may also or alternatively supply printing fluid 106 to printhead 102 through a pathway that uses a pump 132 to urge printing fluid 106 from container 110 through printing fluid port 112. In certain implementations, pump 132 may instead or also urge printing fluid 106 from printhead 102 back through the pathway and fluid port 112 into container 110.

Printing fluid delivery system 108 also includes a fail safe valve 130 within the pathway between container 110 and printhead 102. Fail safe valve 130 is configured to automatically prevent printing fluid 106 from flowing in either direction between container 110 and printhead 102 when the printer is non-operational, for example, due to a loss of electrical power to printing device 100.

In FIG. 1, fail safe valve 130 is illustrated in a bypass position with regard to (optional) pump 132, such that printing fluid 106 may flow between container 110 and printhead 102 without being urged by pump 132 when fail safe valve, 130 is open.

Fail safe valve 130 is a normally closed electrically operated valve that can be mechanically opened. For example, fail safe valve 130 may be configured to stay open only when adequate electrical power is available to printing device 100 to prevent potential leaking of printing fluid 106 out of nozzles 104 when adequate electrical power is unavailable to the printing device (e.g., a power switch is turned off, the printing. device is unplugged, electrical power is out, etc.). In certain implementations, for example, fail safe valve 130 may include a solenoid, electromagnet or other electrically activated switching mechanism that closes when power is no longer available.

Figure 2A:
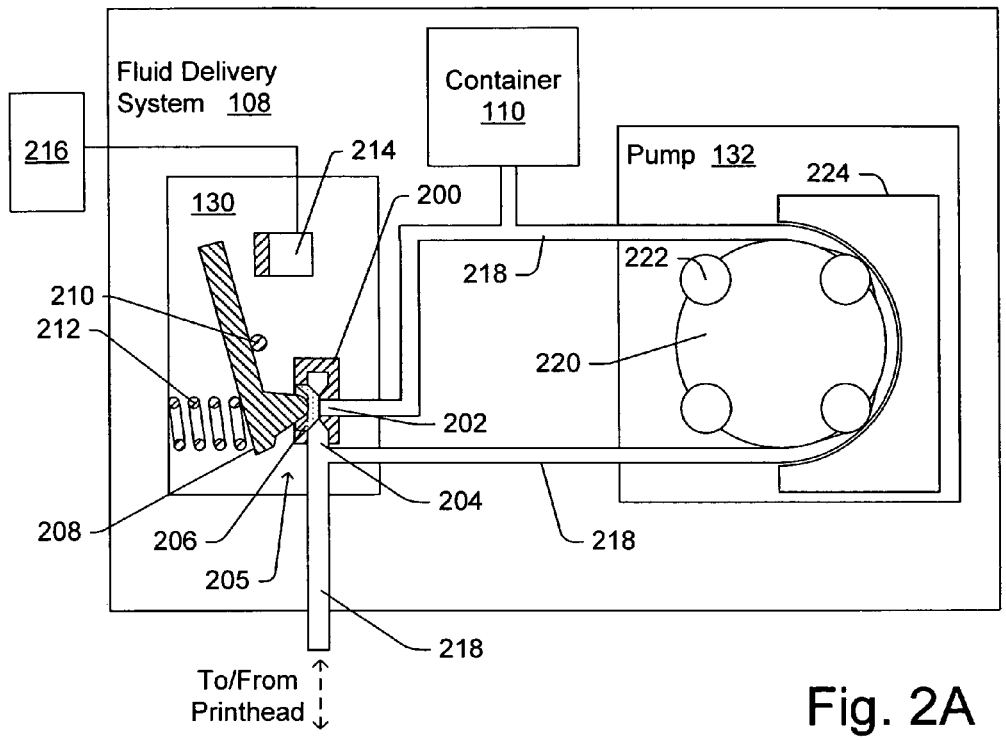
FIGS. 2A-B are cross-sectional diagrams illustrating a portion of a fluid delivery system having a fail safe valve, in accordance with certain exemplary implementations.

Attention is drawn next to FIG. 2A, which illustrates in more details an exemplary fail safe valve 130 and pump 132 in accordance with certain implementations of the present invention.

Here, container 110 is coupled to pathway tubing 218 which enters fail safe valve 130 at a first port 202 and pump 132, illustrated in this example as being a peristaltic pump. Pathway tubing 218 is coupled to fail safe valve 130 at a second port 204 and continues on to the printhead.

Pump 132 includes a housing portion 224 that is configured to contact tubing 218 as rollers 222 attached to a wheel portion 220 roll and press tubing 218 closed in a manner that urges the printing fluid within tubing 218 to flow in the direction of rotation of wheel portion 220. Such pumps are well known. Other types of pumps may also be used.

In this example, fail safe valve 130 includes a sealing member 205 in the form of a flexible member 206 and control member 208. In FIG. 2A, sealing member 205 is in a closed position such that ports 202 and 204 are not fluidically coupled together. Flexible member 202 has been urged by control member 208 into housing 200 by a closing force applied by a resilient member 212, which in this example is a coil spring.

Figure 2B:
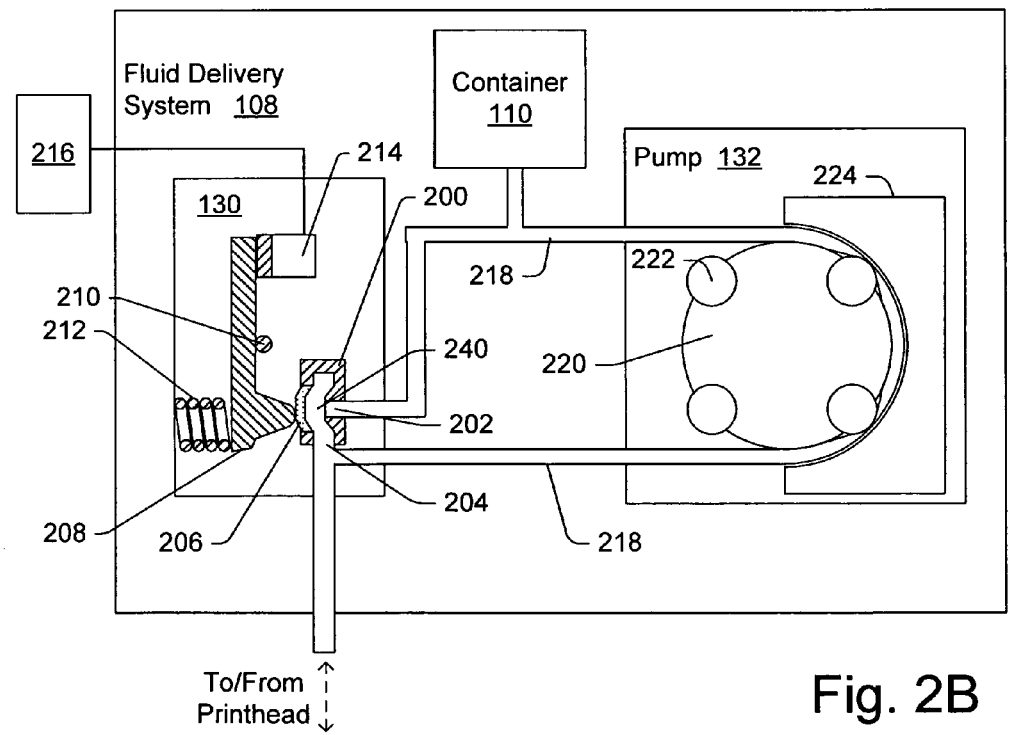

Control member 208 extends beyond housing 200 in this example. Control member 208 is configured to allow flexible member 206 to resiliently return to an open shape when fail safe valve is in an open position, for example, as illustrated in FIG. 2B. As illustrated in FIG. 2B, when moved to the open position, flexible member 206 is shaped to fluidically couple first port 202 and second port 204 together. Thus, the first and second ports met to form a chamber 240 inside housing 200.

Control member 208 is acted upon by an opening force that is opposed to and greater than the closing force. The resulting force differential causes control member to pivot about an axle 210 so as to be brought close enough to an electrically controlled mechanism 214 (e.g., an electromagnet or the like) that fail safe valve 130 remains in the open position. Electrically controlled mechanism 214 applies a holding force to control member 208 that is opposed to and equal to or greater than the closing force. Control member 208 may include, for example, ferromagnetic material that is attracted by a magnetic field produced by electrically controlled mechanism 214. An electrical power source 216 is shown as being operatively coupled to electrically controlled mechanism 214.

Figure 3A:
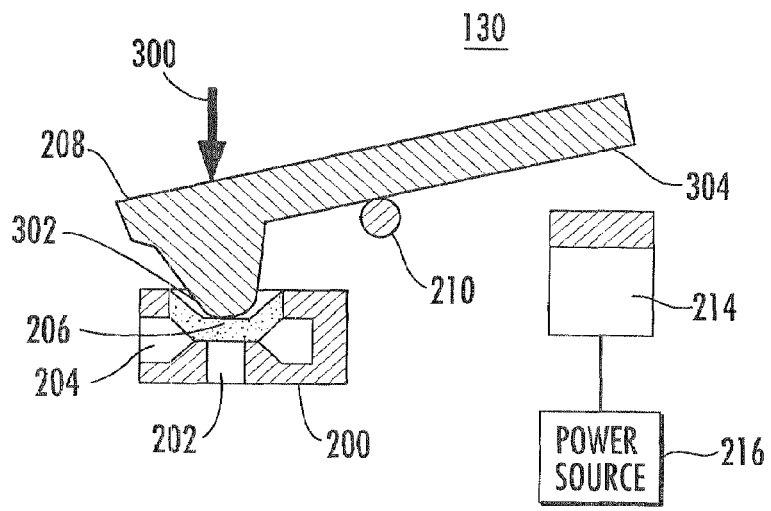
FIGS. 3A-C are block diagrams illustrating the operation of a fail safe valve features, in accordance with certain exemplary implementations.
Figure 3B:
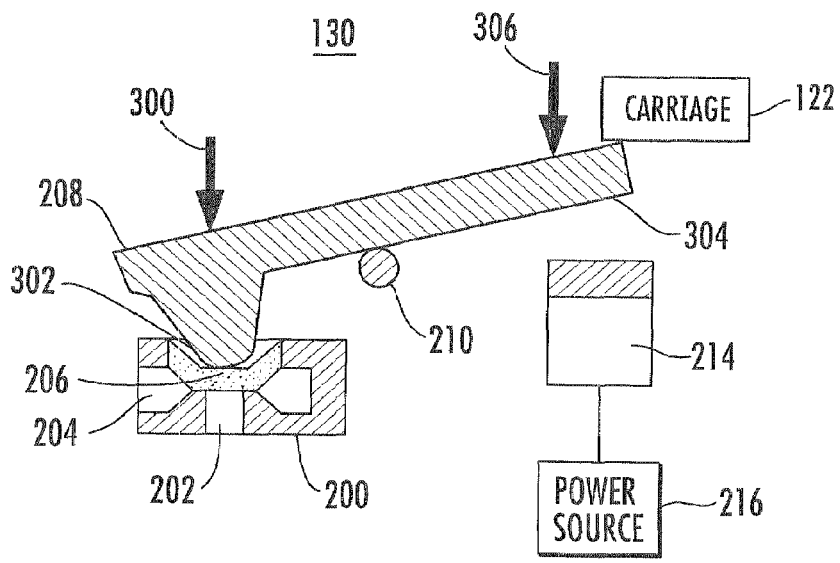
Figure 3C:
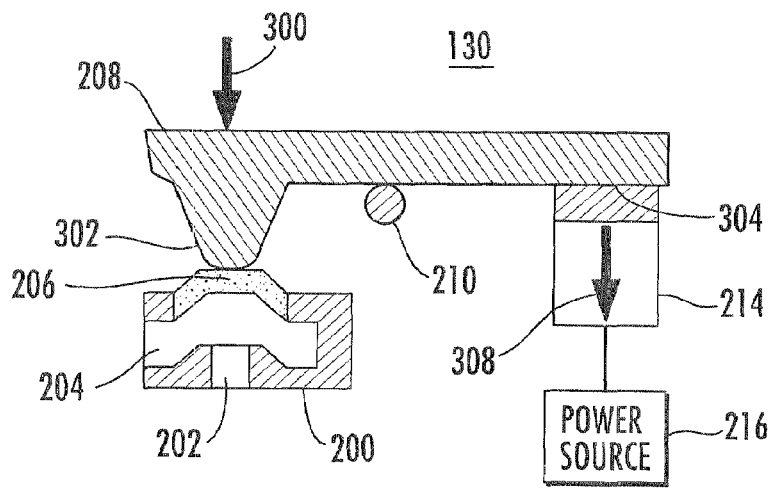

FIGS. 3A-C further illustrate the operation fail safe valve 130. In FIG. 3A, fail safe valve 130 is shown in its normally closed position. Control member 208 includes a contact surface 302 which contacts flexible member 206 in this closed position. Control member 208 also includes a pivoting portion represented here by an axle 306. Control member 208 pivots about a pivot point with pivoting portion 314. Control member 208 includes a distal portion 304 that includes a material that is attracted to the magnetic field of electrically controlled mechanism 214.

The resilient member is represented in this example by a closing force 300 which causes contact surface 302 to force flexible member 206 into housing 200 and against a surface surrounding first port 202 thereby fluidically sealing first port 202. Flexible member 206 is resilient itself and/or has shape memory properties that allow it to change its shape once closing force 300 is overcome by either an opening force 306 and/or holding force 308 of proper magnitude.

In FIG. 3B, an opening force 306 is applied to the distal portion 304 of control member 208. Here, opening force 306 acts in opposition to closing force 300 as a result of the pivoting portion. When opening force 306 as applied to control member 208 is greater than closing force 300, then control member 208 will move (pivot) allowing flexible member 206 to change shape and unseal first port 202. Force 306 may be provided by one or more mechanically moving portions of the printing device. For example, in certain implementations, a portion of the carriage 122 (FIG. 1) is moved to physically contact control member 208.

Once fail safe valve 130 is open, then holding force 308 maintains the valve in the open position. In certain implementations, the holding force may also serve as or otherwise assist in providing some of the opening force.

Figure 4:
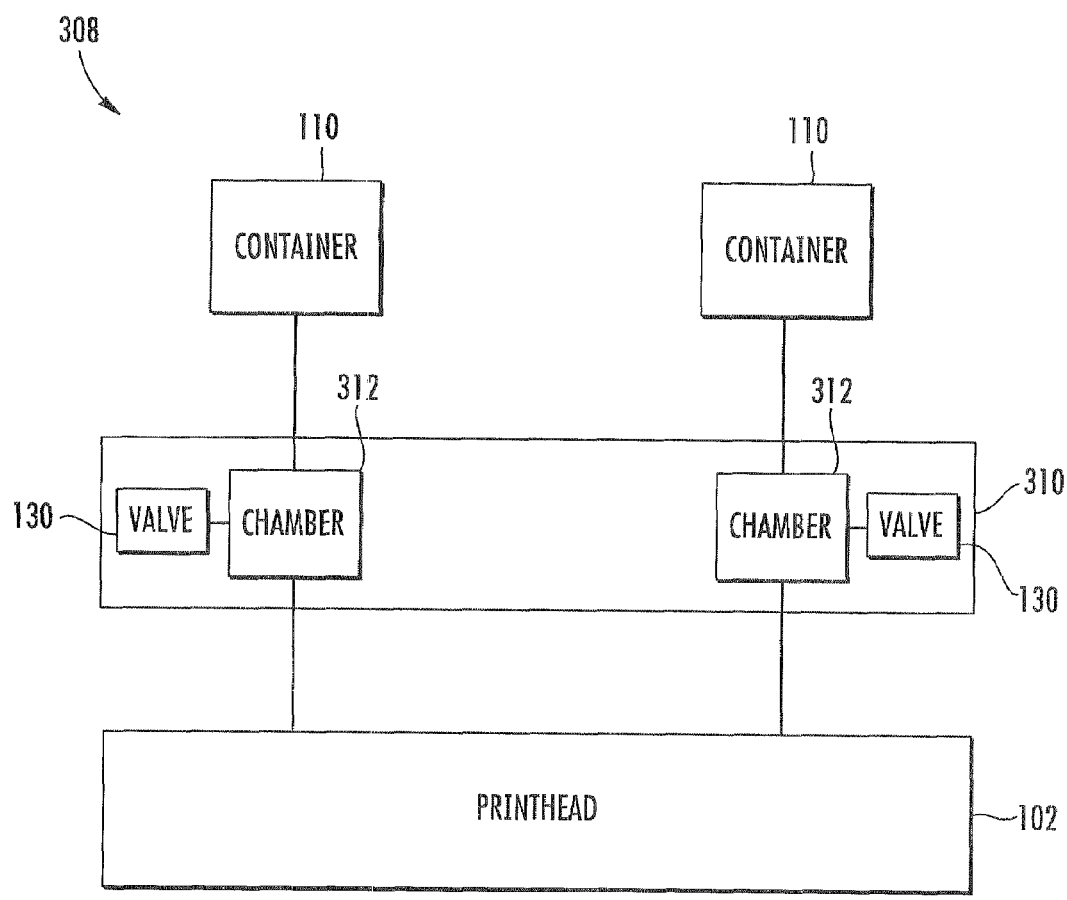
FIG. 4 is a schematic illustration of another embodiment of the fluid delivery system of FIG. 1 according to an example embodiment.

As schematically shown in FIG. 4, in certain implementations, fluid delivery system 308, another embodiment of system 108, may supply a plurality of printing fluids to printhead 102. In such systems, a corresponding plurality of containers 110, fail safe valves 130 and passageway elements may be provided. The fail safe valves 130 may share a common housing 310 with multiple chambers 312. The control members may be connected together in some manner, for example, by a single axle or the like, such that all of the fail safe valves 130 operate together. In such implementations, a single resilient member and/or a single electrically controlled mechanism may be used.

Although the above disclosure has been described in language specific to structural/functional features and/or methodological acts, it is to be understood that the appended claims are not limited to the specific features or acts described. Rather, the specific features and acts are exemplary forms of implementing this disclosure.

What is claimed is:

1. An apparatus for use in a printing device, the apparatus comprising:

a housing having a first port configurable to receive a printing fluid and a second port configurable to output said printing fluid, said housing forming a chamber therein;

a sealing member at least partially arranged within said housing and configured to move between an open position and a closed position, said first port and said second port being fluidically coupled together when said sealing member is in said open position and fluidically uncoupled when said sealing member is in said closed position;

a resilient member operatively coupled to said sealing member and configured to urge said sealing member towards said closed position with a closing force;

wherein said sealing member is further configurable to respond to an opening force applied thereto by moving from said closed position towards said open position when said opening force is greater than said closing force, the opening force applied to the sealing member by a movable carriage of the printing device; and an electromagnet operatively coupled to said sealing member and configured to maintain said sealing member in said open position with a holding force that is equal to or greater than said closing force in response to an electrical signal.

2. The apparatus as recited in claim 1, said sealing member comprising:
a flexible member at least partially arranged within said chamber and configured to sealingly contact a surface of said chamber in said closed position; and
a control member at least partially arranged outside of said chamber and configured to move said flexible member in response to said closing force and said opening force.

3. The apparatus as recited in claim 2, wherein at least a portion of said control member includes a material that is attracted by a magnetic field produced by said electromagnet when said electrical signal is applied to apply said holding force.

4. The apparatus as recited in claim 2, said control member comprising a pivoting portion.

5. The apparatus as recited in claim 4, said pivoting portion comprising an axle.

6. The apparatus as recited in claim 1, said resilient member comprising a spring.

7. The apparatus as recited in claim 1, said housing forming a plurality of chambers, each chamber having a unique first port configurable to receive a specific printing fluid and a unique second port configurable to output said specific printing fluid, and wherein each chamber includes one of a plurality of sealing members therein.

8. The apparatus as recited in claim 7, said resilient member being operatively coupled to each of said sealing members and configured to urge all of said sealing member towards closed positions with said closing force.

9. The apparatus as recited in claim 7, wherein said electromagnet comprises a single electromagnet and said single electromagnet being operatively coupled to each of said sealing members and configured to maintain all of said sealing members in open positions with said holding force that is equal to or greater than said closing force in response to said electrical signal.

10. The apparatus as recited in claim 1, wherein said electrical signal is only applied when the printing device is supplied with an electrical power signal.

11. A system comprising:
a movable carriage;
a printhead arranged on said movable carriage;
a printing fluid supply container; and
a pathway configured to selectively fluidically couple said printing fluid supply container to said printhead, said pathway comprising an electrically operated normally closed valve that is configured to move to an open state as a result of movement of said moveable carriage, to remain in the open state based on an availability of an electrical power signal and to automatically move without electrical power from the open state to the closed state in absence of the electrical power signal.

12. The system as recited in claim 11, said pathway further comprising a pump configured to selectively urge a printing fluid to flow between said printing fluid supply container and said printhead.

13. The system as recited in claim 11, further comprising:
a plurality of printing fluid supply containers including the printing fluid supply container; and
a plurality of electrically operated normally closed valves including the electrically operated normally closed valve,
wherein said pathway is configured to selectively fluidically couple each of said printing fluid supply containers to said printhead, and wherein the electrically operated normally closed valves are configured to open within each of said chambers as a result of movement of said moveable carriage, to remain open within each of said chambers based on said availability of said electrical power signal and to automatically move without electrical power from the open state to the closed state in absence of the electrical power signal.

14. The as recited in claim 11, wherein the valve comprises an electrically activated switching mechanism selected from a group of switching mechanisms consisting of a solenoid and an electromagnet.

* * * * *

UNITED STATES PATENT AND TRADEMARK OFFICE
CERTIFICATE OF CORRECTION

PATENT NO. : 7,568,793 B2  Page 1 of 1
APPLICATION NO. : 11/262196
DATED : August 4, 2009
INVENTOR(S) : William E. Lewey et al.

It is certified that error appears in the above-identified patent and that said Letters Patent is hereby corrected as shown below:

In column 6, line 37, in Claim 14, after "The" insert -- system --.

Signed and Sealed this

Twenty-third Day of March, 2010

David J. Kappos
*Director of the United States Patent and Trademark Office*